(12) United States Patent
Naccari et al.

(10) Patent No.: US 7,528,991 B2
(45) Date of Patent: May 5, 2009

(54) METHOD OF GENERATING A MASK IMAGE OF MEMBERSHIP OF SINGLE PIXELS TO CERTAIN CHROMATICITY CLASSES AND OF ADAPTIVE IMPROVEMENT OF A COLOR IMAGE

(75) Inventors: Filippo Naccari, Palermo (IT); Alfio Castorina, Linera (IT); Arcangelo Ranieri Bruna, San Cataldo (IT); Alessandro Capra, Gravina di Catania (IT); Silvia Maria Francesca Cariolo, Tremestieri Etneo (IT); Sebastiano Battiato, Aci Catena (IT); Giovanni Gallo, Catania (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 637 days.

(21) Appl. No.: 11/216,764

(22) Filed: Aug. 31, 2005

(65) Prior Publication Data

US 2006/0050957 A1    Mar. 9, 2006

(30) Foreign Application Priority Data

Aug. 31, 2004  (IT)  .......................... VA2004A0032

(51) Int. Cl.
*G06F 15/00* (2006.01)
*G06K 1/00* (2006.01)
*H04N 1/60* (2006.01)
*G06K 15/00* (2006.01)

(52) U.S. Cl. ...................................... 358/1.9; 358/3.04
(58) Field of Classification Search ................. 382/165; 358/1.9, 1.1, 3.04, 2.1, 2.99, 3.03, 3.1, 3.14, 358/3.13, 3.16
See application file for complete search history.

(56) References Cited

U.S. PATENT DOCUMENTS

2003/0202697 A1 *   10/2003   Simard et al. ............... 382/195

* cited by examiner

*Primary Examiner*—Douglas Q Tran
(74) *Attorney, Agent, or Firm*—Lisa K. Jorgenson; Allen, Dyer, Doppelt, Milbrath & Gilchrist, P.A

(57) ABSTRACT

In the method, the membership image is produced through a multi-stage process that contemplates a first punctual classification stage generating a rough membership image, followed by a low-pass filtering of regionalization of the image through a down-sampling of the image followed by an up-sampling of the image, and in a further step of merging the regions that overcomes the superposition effects induced by the low-pass filtering operation. The so generated membership image contains semantic information of the input image that may be used for effectively implementing an adaptive correction/improvement of the color of the input image. For an adaptive correction/improvement of the color, the encoded data of the generated membership image is fed in parallel to the data of the real image to an adaptive modification block of the color of the image pixels.

14 Claims, 6 Drawing Sheets

METHOD OF GENERATING A MASK IMAGE OF MEMBERSHIP OF SINGLE PIXELS TO CERTAIN CHROMATICITY CLASSES AND OF ADAPTIVE IMPROVEMENT OF A COLOR IMAGE

FIELD OF THE INVENTION

The present invention relates generally to image processing including techniques for acquiring and processing color images, and, more specifically to an adaptive technique for color correction.

BACKGROUND OF THE INVENTION

The popularity of imaging consumer devices such as digital still cameras, imaging phones and the like and of digital image processing techniques have led to a proliferation of new enhancement processes of color images both in global or semantic terms, as discussed, for example, in S. Battiato, A. Castorina, M. Guarnera, P. Vivirito "A Global Enhancement Pipeline for Low-cost Imaging Devices", IEEE Transactions on Consumer Electronics, Vol. 49, Issue 3, pp. 670-675, August 2003 and/or S. Battiato, A. Bosco, A. Castorina, G. Messina "Automatic Global Image Enhancement by Skin Dependent Exposure Correction" Proc. of IEEE-EURASIP Workshop on Nonlinear Signal and Image Processing, NSIP 2003, Grado, Italy, June 2003.

For still pictures of natural scenes, landscapes, portraits etc., a widely accepted assumption is that colors related to a small number of classes have a major perceptive impact on the human visual system. This is discussed, for example, in S. N. Yendrikhovskij, F. J. J. Blommaert, H. de Ridder, "Optimizing color reproduction of natural images", Proc. Of Sixth Color Imaging Conference: Color Science, Systems and Applications, pp. 140-145, 1998; E. J. Lee, Y. H. Ha, "Favorite Color Correction for Favorite Colors", IEEE Trans. On Consumer Electronics, vol. 44, No. 1, pp. 10-15, February 1998; and U.S. Pat. No. 6,738,510, "Image Processing Apparatus", 2001.

Studies show that basic chromatic classes are essentially: skin (complexion), vegetation, sky/sea. These classes seem to have a predominant perceptive impact on the human visual system. Classical global techniques (histogram equalization, contrast enhancement) work in an unsupervised way, that is without taking into account specific peculiarities of each of the color classes of an image to be processed, as discussed in R. C. Gonzalez, R. E. Woods, "Digital Image Processing", Addison Wesley, 1993.

Other approaches of color correction are known. For example, PaintShopPro8: http://www.jasc.com, Jasc Software Inc. or ICorrect: http://www.picto.com, Pictographics Inc., allow an automatic color enhancement. The first technique allows to perform an automatic saturation enhancement, by correcting the whole image in the same way without implementing any adaptive control. By contrast, the second technique performs a manually driven color correction, in a semi-automatic way. The user must specify the color targets for real classes and then a global correction is performed on the whole image, often producing unpleasant color cast artifacts. In both cases a global correction is performed on the whole image.

The U.S. Pat. No. 6,738,510 describes a possible approach for a color class guided correction. Other patents, such as U.S. Pat. No. 6,721,000, "Adaptive Pixel-level color enhancement for a digital camera", Apr. 13, 2004, U.S. Pat. No. 6,611,618, "Wide-Band Image Enhancement", Aug. 26, 2003, and/or U.S. Pat. No. 6,081,653, "Color Imaging", Jun. 27, 2000 describe techniques of color correction in a general or adaptive way.

The techniques for image correction/improvement according to an adaptive approach, even if potentially effective, so far are not widely used because of the intrinsic difficulties of adequately filtering the large amount of statistical data that may be gathered from an image to be processed containing many details of different colors without requiring a burdensome amount of computing resources.

SUMMARY OF THE INVENTION

The present invention overcomes these difficulties and drawbacks of known systems for adaptive image processing based on the definition of a certain number of classes of colors of major visual impact.

The present invention provides a method for correcting/improving each color of an image that does not require large computational resources, though producing improved results in terms of objective improvement of the image when compared with comparable commercially known systems.

The method of the invention is based on the generation of a membership image of the pixels of the input image to one or proportionately to more classes of a plurality of pre-established classes of chromaticity or hues representative of certain real objects, for instance skin (complexion), vegetation, sky/sea, etc., through a fully automated processing based on the definition of a look-up table of target values of chromaticity or hue for each of the classes to which each pixel of the input image is to be discriminately assigned.

Any number of classes of chromaticity may be pre-established as a function of the type of input images or of certain requirements of the application of correction/improvement of the color or even of other applications.

According to an aspect of the invention, the membership image is produced through a multi-stage process that contemplates a first punctual classification stage generating a rough membership image, followed by a low-pass filtering of regionalization of the image through a down-sampling of the image followed by an up-sampling of the image, and in a further step of merging the regions that overcomes the superposition effects induced by the low-pass filtering operation.

The so generated membership image according to the invention contains semantic information of the input image that may be used for effectively implementing an adaptive correction/improvement of the color of the input image, but the same information is also useful for other selection and semantic analysis applications of color images. For an adaptive correction/improvement of the color, the encoded data of the so generated membership image are fed in parallel to the data of the real image to a block of adaptive modification of the color of the image pixels.

Therefore, the adaptive color correction/improvement process of each pixel of the input image, the pertinence of which to one or the other of pre-established chromaticity classes corresponding to specific objects of the scene is established by the membership image and includes: defining a table of chromaticity target values $(r_t, g_t)$ for each established class of colors of specific objects (skin, vegetation, sky/sea); converting the triplet of RGB values of each pixel (i) of an image to be processed, by mapping the values of the triplet in the red-green chromaticity plane $(r_i, g_i)$, through a normalization step of the pixel intensity; calculating for each cluster of pixels belonging to a certain class (c) of colors of one of the specific objects (skin, vegetation, sky/sea) a pair of statistical values $(\Delta_{rc}, \mu_{gc})$ locating all classified clusters of the image in the red-green chromatic plane; calculating for each cluster the distance ($\Delta_{rc}$, $\Delta_{gc}$) to the respective target chromaticity value ($r_{tc}$, $g_{tc}$); determining for each pixel (i) of the image, belonging to a certain class (c) a triplet of target values ($r'_i$, $g'_i$, $b'_i$) in function of the mapping coordinates ($r_i$, $g_i$) of the triplet of original values in the red-green plane and of the distance of the relative cluster ($\Delta_{rc}$, $\Delta_{gc}$) from the relative target color; and carrying out a modulated correction of the color of the pixel through a weighted linear combination of the original triplet of values ($R_i$, $G_i$, $B_i$) and of the target triplet ($R'_i$, $G'_i$, $B'_i$), using two constants a and b for modulating the part of the original image that is preserved after the color correction.

The method of this invention may be implemented via software or by using a hardware device (acceleration card or pipeline).

DETAILED DESCRIPTION OF THE PREFERRED EMBODIMENTS

To generate the color statistics, suitable to be reliably used for image analysis and classification, a huge database of color images has been used. The database was composed of 450 true color (24 bits per pixel), high quality, and well balanced images that were chosen according to subjectively perceived naturalness. Images affected by severe and/or anomalous color distortions, according to a common sense of expected color/scene pairing, were discarded.

As a preprocessing step, all the selected images were segmented via a known process to avoid collecting statistics on excessively scattered color samples. To this aim, the process described in D. Comaniciu, D. Meer, "Robust Analysis of Feature Spaces: Color Image Segmentation", Proc. IEEE Conf. Computer Vision and Pattern Recognition, pp. 750-755, 1997 was used, although other alternative approaches may be satisfactorily used.

Figure 1:
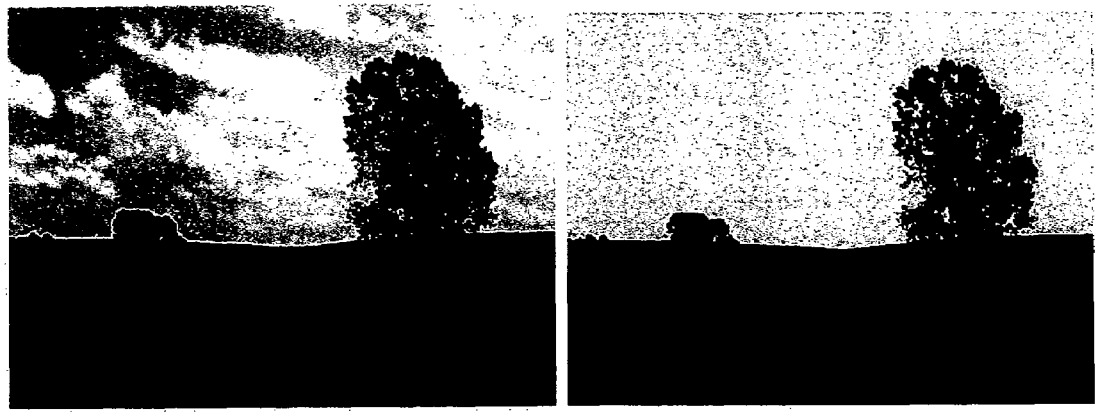
FIG. 1 depicts an input image and the corresponding segmented image wherein the samples of sky and of vegetation have been gathered.

FIG. 1 shows an example of segmentation. The left image is the real image while the segmented image, in which the sky and vegetation pixels have been extracted, is shown at the right. All the collected sample pixels of sky and vegetation were converted from the RGB format, or better from the RGB color space, to the HSL (Hue Saturation Lightness) color space using the following formulas:

$$H = \cos^{-1}\left\{\frac{\frac{1}{2}[(R-G)+(R-B)]}{[(R-G)^2+(R-B)(G-B)]^{\frac{1}{2}}}\right\} \quad (1)$$

$$S = 1 - \frac{3}{R+G+B} \cdot \min(R, G, B) \quad (2)$$

$$L = \frac{1}{3} \cdot (R+G+B) \quad (3)$$

Figure 2:
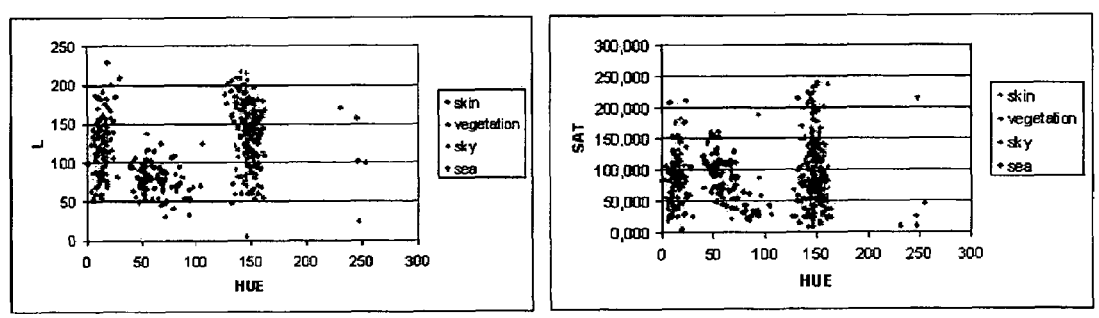
FIG. 2 shows respective graphs of samples gathered on planes HL and HS wherein the vertical clusters H may be easily located.

All the collected samples where plotted both in the HS and HL planes as shown in FIG. 2, at the left and at the right, respectively. Even a simple visual inspection clearly shows how well the H component defines narrow, non overlapping vertical clusters that are ideally suited for a very reliable classification.

Figure 3:
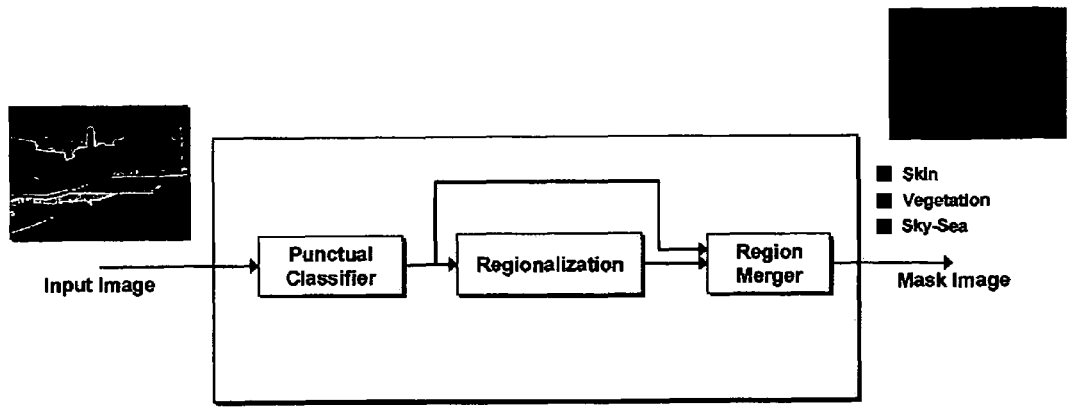
FIG. 3 is a block diagram illustrating the process for generating the final mask.

The process for generating a membership mask is driven by the collected color statistics, leading from a classification of the input image to generate a "pseudo image" representing the membership mask. The rank of membership of each pixel to the pre-established various classes of certain real objects (skin, vegetation, sky/sea), is determined through an analysis process that can be outlined as including the distinct steps: Punctual classification; Regionalization; and Regions merging. A block description of the process is depicted in FIG. 3.

Punctual Classification: In this block the image is analyzed on a per pixel basis, and after the H and S values are extracted from the RGB color triplet using the equations (1) (2), the pixel P(x, y) is assigned as belonging (or not belonging) to one of the contemplated color classes using the following rules, that have been derived in a straightforward manner from the collected database of images. If ((S(x,y)>TS and L(x,y)>TL) and (H(x,y)<=Lskin or H(x,y)>=Rskin)) then P(x,y) belongs to skin; if ((S(x,y)>TS and L(x,y)>TL) and (H(x,y)>=Lsky or H(x,y)<=Rsky)) then P(x,y) belongs to sky; and if ((S(x,y)>TS and L(x,y)>TL) and (H(x,y)>=Lveg or H(x,y)<=Rveg)) then P(x,y) belongs to vegetation.

The left-hand side conditions on S and L have been introduced to avoid dealing with misleading values coming from de-saturated and/or low-lightness pixels, while right handside conditions on H have been derived from horizontal clustering bounds on HL and HS plots, as shown in FIG. 2. Values used in the inference rules are reported in the following Table 1.

TABLE 1

| $T_S$ | $T_L$ | $R_{skin}$ | $L_{skin}$ | $R_{sky}$ | $L_{sky}$ | $R_{veg}$ | $L_{veg}$ |
|---|---|---|---|---|---|---|---|
| 20 | 50 | 30 | 230 | 125 | 165 | 40 | 120 |

If the observed pixel does not satisfy any of the rules it remains unclassified.

Figure 4:
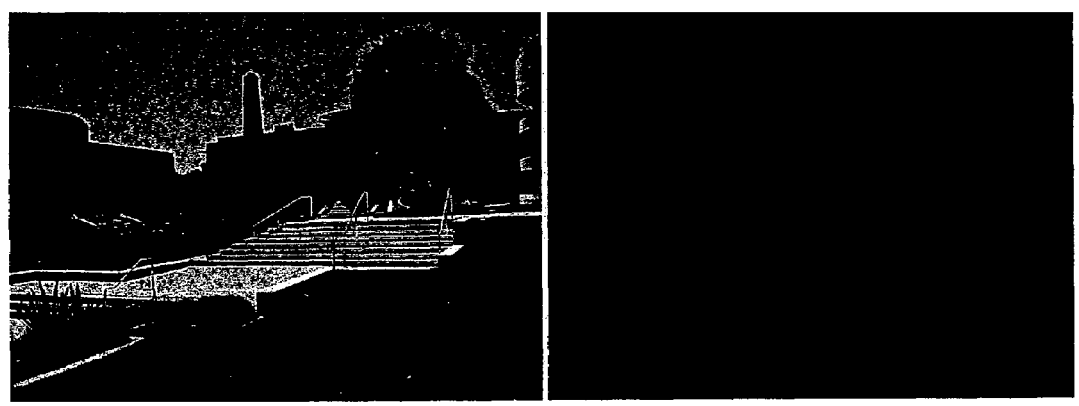
FIG. 4 depicts an input image and its punctual classification.

To code this intermediate raw mask, N-dimensional sets ($x_1, x_2, \ldots, x_N$) are exploited, wherein N is the number of allowed classes. Each set satisfies the following initial state:

$$x_i \neq 0 \Leftrightarrow x_i \in class_i \quad (5)$$

without loss of generality, since in our case we are dealing with three color classes: $c_1$=skin;

$c_2$=vegetation; and $c_3$=sky; this scheme leads to the a coding where 255 is used to identify non-zero sets components: skin pixel-(255,0,0); vegetation pixel-(0,255,0); sky pixel-(0,0,255); unclassified pixel-(0,0,0). This produces a pseudo-color mask where each set corresponds to an RGB triplet. As will be shown later this image will be used for generating final values for each pixel. FIG. 4 shows an input image and the rough mask image generated by the punctual classification block.

Regionalization: Punctual classification is likely to not always be perfect, because several pixels, even if identifiable by visual inspection as belonging to the contemplated classes, may not be properly recognized due to their deviation from expected hue values. To expand and improve the results coming from the first punctual classification step, the mask is subjected to a low pass filtering step. The filtering is performed by using a Gaussian kernel, although other choices are possible (for example box filtering, turkey filtering and the like).

Gaussian low pass filter functions can be defined by the following equation:

$$g(x,y) = e^{-(x^2+y^2)/c^2} \quad (6)$$

where the space constant c determines the amount of filtering. Experimentally, it has been found that Eq. 6 requires very high values of c, thus making the filtering in the spatial domain computationally expensive.

According to an aspect of this invention, instead of moving into frequency domain via an FFT, spatial filtering is performed on a down-sampled mask image followed by a successive up-sampling. This dramatically reduces the required computational resources and produces almost the same results of an onerous spatial or FFT filtering.

Figure 5:
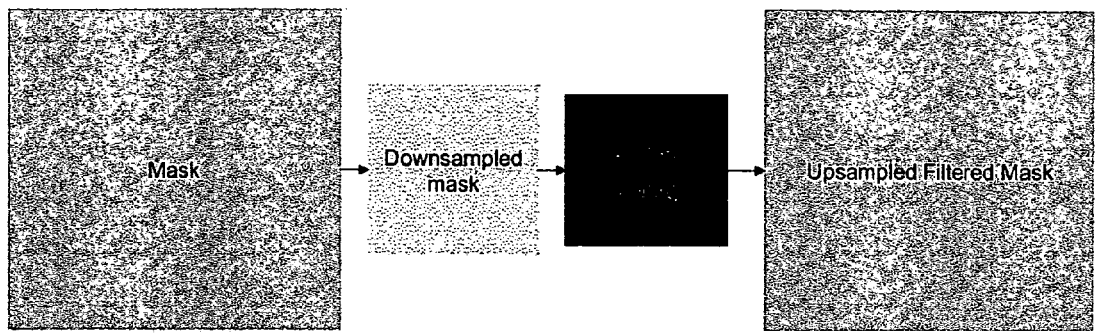
FIG. 5 is a block diagram showing the sequence of undersampling, filtering and upsampling steps.
Figure 6:
FIG. 6 depicts a low-pass mask.

A depiction of this approach is shown in FIG. 5, whereas FIG. 6 shows how the rough mask of FIG. 4 looks after the spatial filtering performed after down-sampling and after having carried out the successive up-sampling. Sampling may be performed by simple interpolation in both directions, while the combinations of the sampling factor and of the spatial constant c are carefully chosen depending on input image resolution.

After the low pass filtering, values represented in the mask will be interpreted as smoothly varying the membership rank of the underlying pixels to a specific class (e.g. a value of 0,250,80 means that a pixel does not belong to the skin class, decisively belongs to the vegetation class, and weakly belongs to the sky/sea class). Sets after filtering will be indicated as $(x'_1, x'_2, x'_3)$.

Region merging: The function of region merging is to further refine the mask as generated by local classification and regionalization to resolve ambiguities occurring when several discordant classifications insist on the same pixel. This is likely to occur after the second step due to overlapping effects introduced by the regionalization block.

Figure 7:
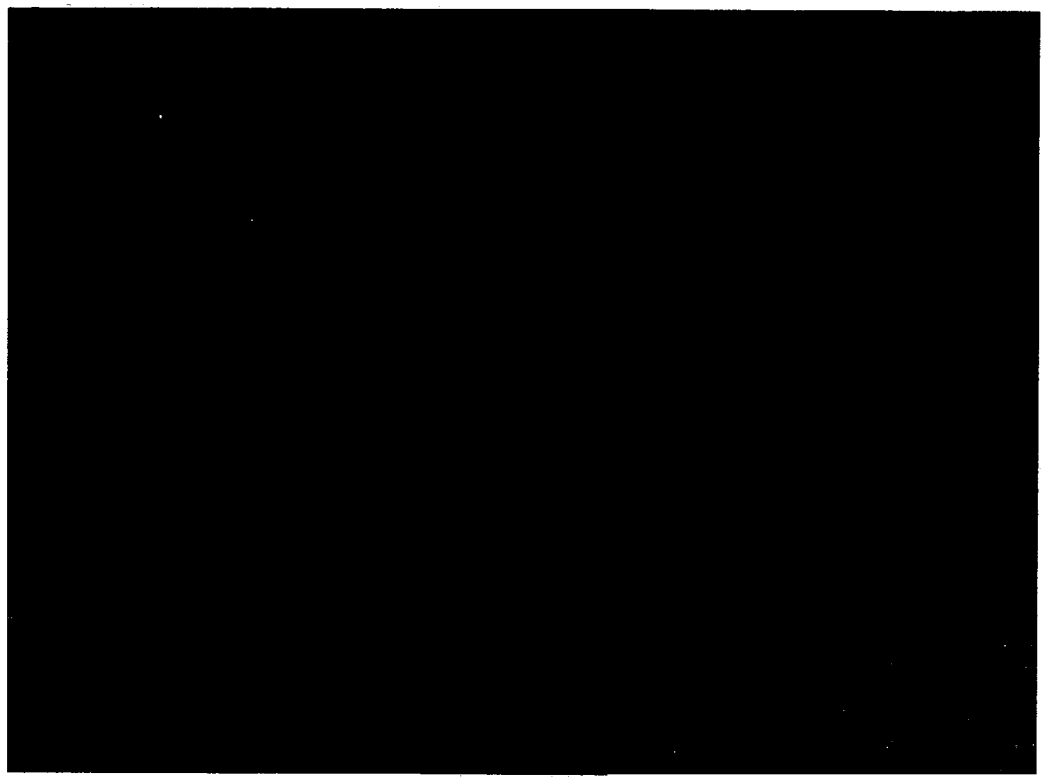
FIG. 7 is a color representation of the final mask.

In these conditions sets no longer satisfy Eq. 5. Several heuristic rules have been designed ad hoc to solve these conflicts. This final processing will lead to a unique membership value $w(x, y)$ and class code $c(x, y)$ for each pixel in position x, y. Values $w(x, y)$ and $c(x, y)$ constitute the final mask with the following meaning:

if $c(x, y) = code_i$ the pixel belongs to class (i) with membership $w(x, y)$; if $c(x, y) = 0$ the pixel $(x, y)$ does not belong to any class and its membership $w(w, y) = 0$; $code_i$ are the labels used to identify the admitted classes. The employed rules are summarized in the following formulas, wherein the operator $\pi$ has the following meaning:

$$\pi_i(x_1, x_2, \ldots, x_N) = x_i \quad (7)$$

if only one of the values inside a set surpasses a given threshold $T_{conf}$, then:

$$c(x,y) = \{code_i : \pi_i(x_1', x_2', x_3') = \max(x_1', x_2', x_3')\}$$

$$w(x,y) = \max(x_1', x_2', x_3');$$

if two or more values exceed a given threshold ($T_{conf}$) and a pixel classification before the filtering step is available then:

$$c(x,y) = \{code_i : \pi_i(x_1, x_2, x_3) \neq 0\}$$

$$w(x,y) = \{x_i : \pi_i(x_1, x_2, x_3) \neq 0\};$$

if two or more values exceed a given threshold ($T_{conf}$), but no classification before the filtering step is available, then the pixel is assigned to the nearest class using a suitable metric, for example the distance of the pixel from the centroid of the clusters of FIG. 2, setting: $w(x,y) = \max(x_1', x_2', x_3')$. FIG. 7 is a color representation of the final membership mask.

Adaptive Color Enhancement: The process that permits generation, starting from an input image and a respective classification or membership mask, of an enhanced output image will now be described. The general case of implementation requires that the color enhancement block be fed with the original image data and the relative classification mask data. The color enhancement pipeline is preferably realized in a hardware form.

The data of the classification mask should be encoded to contain, for each pixel of the original image, both the information related to its belonging to a specific class and the rank of membership itself. If the classification mask is generated by a process capable of discriminating a certain number C of classes and of codifying the rank of membership with a n-bits depth, each pixel of the mask image can be represented with a ($\log_2 C + n$) bit string.

In the sample embodiment, a representation of a mask image has been established with three chromatic classes (respectively relating to: skin, vegetation and sky/sea) and a 8-bit representation of the membership rank. Thus, for the considered example, a 10 bit/pixel representation was necessary for the mask image.

Figure 8:
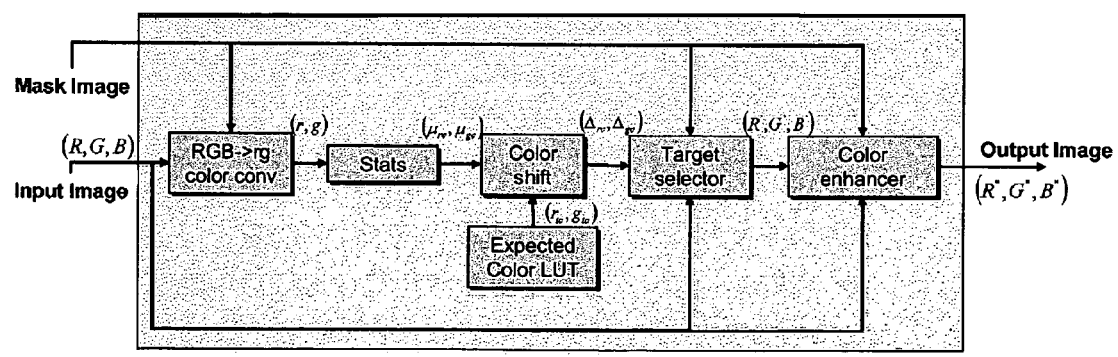
FIG. 8 is a block diagram of the adaptive process of color correction.

FIG. 8 shows a block diagram of the color enhancement process according to this invention. A description of each functional block follows.

Conversion Block RGB→erg: In this first block a color conversion process is performed on the original image (input image) by mapping it in the red-green color space. For each pixel i, the original triplet of values RGB is converted in the respective coordinates $r_i$ and $g_i$ of the red-green color space by a normalization of the intensity of the pixel, according to the following equations:

$$\begin{cases} r_i = \dfrac{R_i}{R_i + G_i + B_i} \\ g_i = \dfrac{G_i}{R_i + G_i + B_i} \end{cases}$$

where RGB values are of the pixels of the input image.

Statistics Accumulation: For each cluster of pixels classified as belonging to a certain class c, from the mask image generated as described above, two statistical values are computed ($\mu_{rc}, \mu_{gc}$) representing mean values of the chromaticity of the cluster to which the pixel belongs. This process allows to localize all the classified clusters in the red-green chromaticity plane and to evaluate the distance from the respective target chromaticity.

Color Shift Computation: For each cluster of pixels classified as belonging to the class c, the chromaticity distance from the target hues is computed as follows:

$$\Delta_{rc} = r_{tc} - \mu_{rc}$$

$$\Delta_{gc} = g_{tc} - \mu_{gc}$$

wherein $r_{tc}$ and $g_{tc}$ are the target hues.

Expected Color Look-Up Table: On a look-up table (LUT) are stored the chromaticity targets for each of the admitted classes. These values are those preliminarily calculated over a vast database of images containing large areas of well exposed subjects selected for representing well defined classes of chromaticity of a scene.

As already mentioned, on this selection of high quality images, an appropriate color segmentation tool, as the one discussed above, was used for extracting, for each admitted class, the target values of the chromaticity, named $r_{tc}$, $g_{tc}$. For the admitted classes of the considered example (skin, vegetation and sky/sea) the table below reports the target values:

TABLE 2

|  | ($r_{tc}$) | ($g_{tc}$) |
|---|---|---|
| Skin | 0.47 | 0.31 |
| Vegetation | 0.35 | 0.43 |
| Sky-Sea | 0.21 | 0.33 |

Target Selector: For each pixel i of the image belonging to the class c, a target triplet ($R'_i$, $G'_i$, $B'_i$) is determined by the equations below:

$$\begin{cases} \dfrac{R'_i}{R'_i + G'_i + B'_i} = r_i + \Delta_{rc} \\ \dfrac{G'_i}{R'_i + G'_i + B'_i} = g_i + \Delta_{gc} \\ \dfrac{R'_i + G'_i + B'_i}{3} = \dfrac{R_i + G_i + B_i}{3} \end{cases}$$

wherein ($R_i$, $G_i$, $B_i$) is the original triplet and ($r_i$, $g_i$) are the values mapped on the red-green chromaticity space and $\Delta_{rc}$ e $\Delta_{gc}$ are the chromaticity distance from the respective target hue.

Color Enhancement: After the target destination is computed, a modulated color correction is performed. The process produces the output triplet ($R''_i$, $G''_i$, $B''_i$) as a weighted linear combination of the original ($R_i$, $G_i$, $B_i$) triplet and the target triplet ($R'_i$, $G'_i$, $B'_i$). The correction is modulated by modifying two constants, respectively a and b, according to needs for determining how much of the original image will be preserved after the color correction.

In the example, the values of the two constants a and b were empirically set to 3 and 2, respectively, as the best trade-off. The weight of the correction w is provided from the mask image generated according to the above described process, the data of which are fed to the correction/improvement pipeline together with the data of the original image.

The correction is carried out according to the following equations:

$$R''_i = \frac{aR_i + b[w_i R'_i + (1 - w_i)R_i]}{a + b}$$

$$G''_i = \frac{aG_i + b[w_i G'_i + (1 - w_i)G_i]}{a + b}$$

$$B''_i = \frac{aB_i + b[w_i B'_i + (1 - w_i)B_i]}{a + b}$$

Figure 9A:
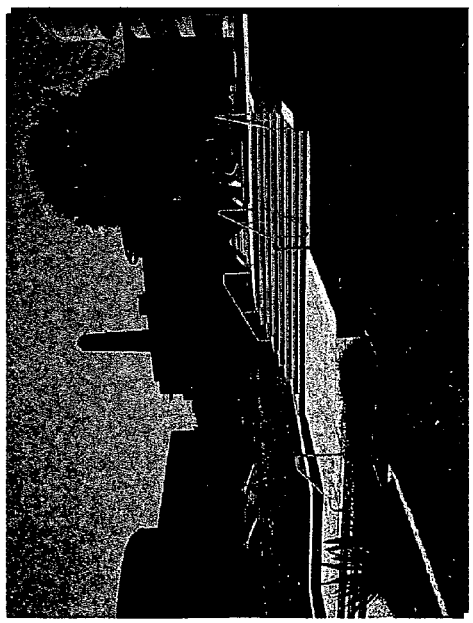
FIGS. 9A-9D depict A) the original image, B) the improved image, C) the classified image, and D) the weighted correction image.
Figure 9B:
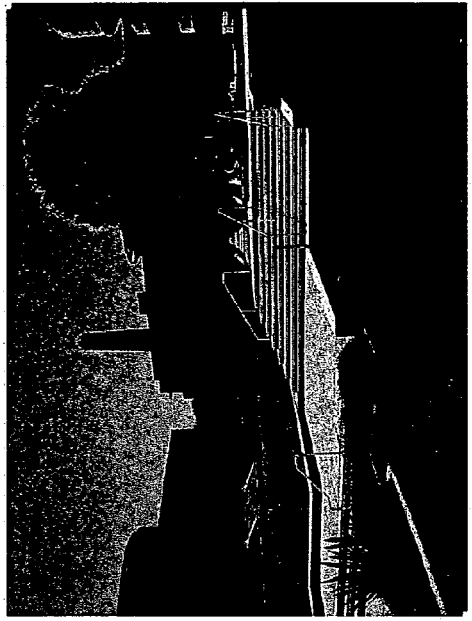
Figure 9C:
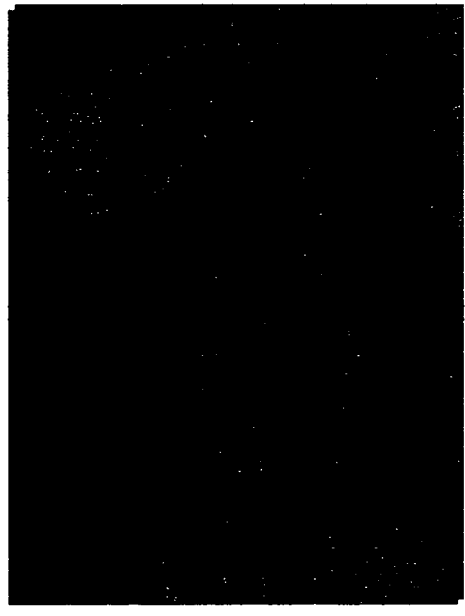
Figure 9D:
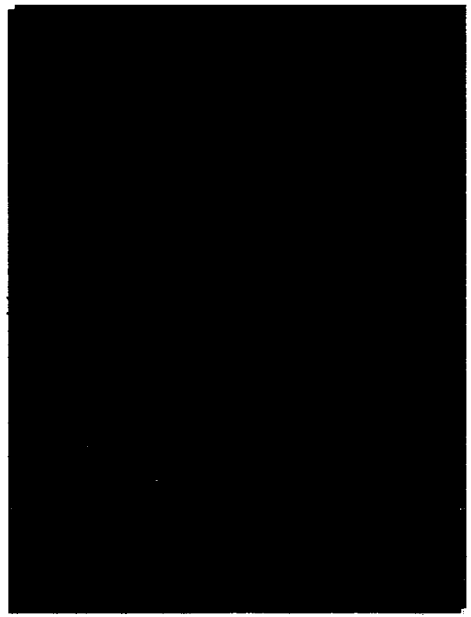
Figure 10A:
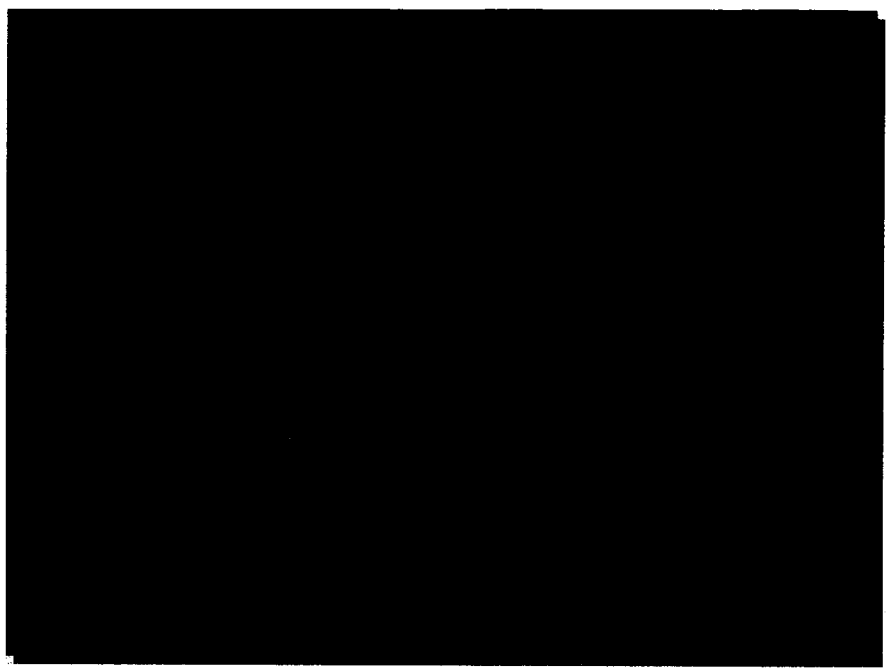
FIGS. 10A-10B show A) a membership image, and B) a difference image.
Figure 10B:

FIGS. 9A, 9B, 9C and 9D show, respectively, an input image, its enhanced version, its classified version and the mask image that is generated for obtaining the correction weights of the original image. The mask image of FIG. 9D shows how the adaptive approach determines corrections of different weight in different areas of the input image.

For sake of comparison, subjective comparative assessments of the results obtained with two color enhancement commercial software were carried out. The comparison was carried out with the PSP technique of color enhancement, disclosed in PaintShopPro8: http://www.jasc.com, Jasc Software Inc., that implements an automatic saturation enhancement, and with the technique (ICorrect), disclosed in http://www.picto.com, Pictographics Inc., that allows a manually controlled color correction in a semi-automatic fashion. To carry out comparative tests, a data set of thirty natural scenes not belonging to the example of statistic classes described herein was used.

Observers with no particular visual defects of color perception and without experience in digital image or color processing, expressed their opinion in a light controlled environment and on a CRT monitor with a standard sRGB profile. Two types of visual tests were performed, one of indistinct personal preference and another of comparative judgment between the original and the enhanced images as obtained by using the different enhancement process being compared.

The following table resumes the indistinct preferences when four differently enhanced images were simultaneously presented to the observers.

| ABSOLUTE PREFERENCE INDEX | |
|---|---|
| ORIGINAL | 20% |
| INVENTION | 36% |
| PSP | 28% |
| ICORRECT | 16% |

This index represents, in terms of percentage, the mean of the choices of the observers for the different color enhancement techniques. The enhancement technique of the present invention gathered the highest preference.

The comparative application results that were collected by randomly showing to each observer three pairs of images, each pair always containing the original image and an enhanced one, are resumed in the following table.

| RELATIVE PREFERENCE INDEX | |
|---|---|
| INVENTION | +23% |
| PSP | +2.5% |
| ICORRECT | −36% |

For each comparison between the original image and an enhanced image a quality score was assigned. The results show, in percentage terms, the increasing/decreasing naturalness, colorfulness and overall quality perceived by the observers. Also in this case, the present invention obtained the highest score.

It will be evident to a skilled person that the above described color enhancement process and, in particular, the automatic pixel classification block may be used for discriminating among any number of admitted classes, that is different types of objects of scenes, in function of the particular environment in which the images are acquired.

It is worth remarking that once an image has been properly classified, the pseudo-image (membership mask image) may be used in various types of application in the field of digital image processing, for exploiting the semantic content of the so generated membership mask image according to the objective sought. A non exhaustive list of applications that may advantageously exploit the information contained in the generated membership mask image, may be as follows: automatic white balancing for target objects; automatic control of exposition in function of the content of the image; classification of images depending on their content; classification of database of images; and the like.

In other words, the functional block that generates a mask image, used for the basic application of adaptive automatic color enhancement/correction in the various areas of the input image, may be used also for other purposes in the field of color digital image processing that may advantageously exploit the semantic information contained in the membership mask image generated according to the above described process, illustrated by the block diagrams of FIG. 3.

That which is claimed is:

1. A method of generating a mask image of classification of individual pixels of a color image to certain defined chromaticity classes, the method comprising:
    converting Red-Green-Blue (RGB) values of each pixel of an input image to Hue-Saturation-Lightness (HSL) values, defining clusters of pixels classifiable in the defined chromaticity classes, to generate a rough image mask;
    generating regions of the rough image mask by down-sampling the rough image mask and low-pass spatial filtering the down-sampled rough image mask followed by an up-sampling of the pixels of the filtered image mask; and
    merging of the generated regions by resolving any classification uncertainties of the regionalization, for generating the mask image of classification.

2. The method according to claim 1, wherein converting RGB values to HSL values comprises converting the ROB values according to:

$$H = \cos^{-1}\left\{\frac{\frac{1}{2}[(R-G)+(R-B)]}{[(R-G)^2+(R-B)(G-B)]^{1/2}}\right\},$$

$$S = 1 - \frac{3}{R+G+B} \cdot \min(R, G, B), \text{ and}$$

$$L = \frac{1}{3} \cdot (R+G+B).$$

3. The method according to claim 1, wherein the defined chromaticity classes correspond to objects in the image.

4. The method according to claim 3, wherein the objects include skin, vegetation and sky/sea.

5. The method according to claim 1, wherein the low-pass spatial filtering comprises a Gaussian filtering.

6. The method according to claim 1, wherein the down-sampling and up-sampling each comprises interpolation.

7. The method according to claim 1, wherein resolving any classification uncertainties of the regionalization comprises resolving uncertainties via a set of heuristic rules.

8. A method of adaptively enhancing a color image as a function of a mask image of classification of single pixels of the color image, the method comprising:
    generating the mask image of classification of individual pixels of the color image to certain defined chromaticity classes by
    converting Red-Green-Blue (RGB) values of each pixel of an input image to Hue-Saturation-Lightness (HSL) values, defining clusters of pixels classifiable in the defined chromaticity classes, corresponding to specific real objects, to generate a rough image mask,
    generating regions of the rough image mask by down-sampling the rough image mask and low-pass spatial filtering the down-sampled rough image mask followed by an up-sampling of the pixels of the filtered image mask, and
    merging of the generated regions by resolving any classification uncertainties of the regionalization via a set of heuristic rules, for generating the mask image of classification; and enhancing the color image by
    defining a table of chromaticity target values for each class of colors of specific real objects,
    converting a triplet of RGB values of each pixel of the image to be processed, by mapping the values of the triplet in the red-green chromaticity plane, through a normalization of the pixel intensity,
    calculating, for each cluster of pixels belonging to a certain class of hues of one of the specific objects, a pair of statistical values, mapping all classified clusters of the image in the red-green chromaticity plane,
    calculating for each cluster its distance from the respective target chromaticity value,
    determining for each pixel of the image, belonging to a certain class of hues, a triplet of target values as a function of the mapping coordinates of the triplet of original RGB values in the red-green plane and of the distance of the relative cluster from the relative target color, and
    carrying out a modulated correction of the color of each pixel through a weighted linear combination of its original triplet of RGB values and of the target triplet using two constants for modulating the part of the original image that is preserved after the color correction.

9. The method according to claim 8, wherein converting RGB values to HSL values comprises converting the RGB values according to:

$$H = \cos^{-1}\left\{\frac{\frac{1}{2}[(R-G)+(R-B)]}{[(R-G)^2+(R-B)(G-B)]^{1/2}}\right\},$$

$$S = 1 - \frac{3}{R+G+B} \cdot \min(R, G, B), \text{ and}$$

$$L = \frac{1}{3} \cdot (R+G+B).$$

10. The method according to claim 8, wherein the defined chromaticity classes correspond to objects in the image.

11. The method according to claim 10, wherein the objects include skin, vegetation and sky/sea.

12. The method according to claim 8, wherein the low-pass spatial filtering comprises a Gaussian filtering.

13. The method according to claim 8, wherein the down-sampling and up-sampling each comprises interpolation.

14. The method according to claim 8, wherein resolving any classification uncertainties of the regionalization comprises resoloving uncertainties via a set of heuristic rules.

* * * * *

UNITED STATES PATENT AND TRADEMARK OFFICE
CERTIFICATE OF CORRECTION

PATENT NO. : 7,528,991 B2
APPLICATION NO. : 11/216764
DATED : May 5, 2009
INVENTOR(S) : Naccari et al.

It is certified that error appears in the above-identified patent and that said Letters Patent is hereby corrected as shown below:

Column 3, Line 4      Delete: "$r_i$,"
                      Insert: --$r'_i$,--

Column 4, Line 64     Delete: "to the a"
                      Insert: --to a--

Column 6, Line 44     Delete: "erg:"
                      Insert: --rg:--

Column 9, Claim 7     Delete: "resoloving"
Line 59               Insert: --resolving--

Column 10, Claim 14   Delete: "resoloving"
Line 63               Insert: --resolving--

Signed and Sealed this

Eighteenth Day of August, 2009

David J. Kappos
*Director of the United States Patent and Trademark Office*